United States Patent [19]

Meyer et al.

[11] Patent Number: 5,081,689
[45] Date of Patent: Jan. 14, 1992

[54] APPARATUS AND METHOD FOR EXTRACTING EDGES AND LINES

[75] Inventors: Robert H. Meyer, Redondo Beach; Kevin K. Tong, El Monte, both of Calif.

[73] Assignee: Hughes Aircraft Company, Los Angeles, Calif.

[21] Appl. No.: 328,919

[22] Filed: Mar. 27, 1989

[51] Int. Cl.$^5$ .............................................. G06K 9/00
[52] U.S. Cl. ......................................... 382/22; 382/56
[58] Field of Search ....................... 382/22, 27, 21, 56

[56] References Cited

U.S. PATENT DOCUMENTS

| | | | |
|---|---|---|---|
| 4,545,067 | 10/1985 | Juvin et al. | 382/21 |
| 4,566,124 | 1/1986 | Yamamoto et al. | 382/22 |
| 4,771,474 | 9/1988 | Takashima et al. | 382/56 |
| 4,876,729 | 10/1989 | Watanabe et al. | 382/22 |

OTHER PUBLICATIONS

"Theory of Edge Detection", by D. Marr and E. Hildreth, Proc. of the Royal Society of London, B 207, pp. 187-217, 1980.
"Linear Feature Extraction and Description", by R. Nevatia and K. R. Babu, Computer Graphics and Image Processing, vol. 13, pp. 257-269, 1980.
"On Detecting Edges", by V. S. Nalwa and T. O. Binford, IEEE Trans. on Pattern Analysis and Machine Intelligence, PAMI-8, No. 6, pp. 699-714, 1986.
"Digital Step Edges from Zero Crossing of Second Directional Derivatives", by R. M. Haralick, IEEE Trans. on Pattern Analysis and Machine Intelligence, PAMI-6, No. 1, pp. 58-68, 1984.
"A Computational Approach to Edge Detection", by J. Canny, IEEE Trans. on Pattern Analysis and Machine Intelligence, PAMI-8, No. 6, pp. 679-698, 1986.
"Detection, Localization, and Estimation of Edges", by J. S. Chen and G. Medioni, IEEE Trans. on Pattern Analysis and Machine Intelligence, vol. 11, No. 2, pp. 191-198, 1989.
"Object Detection Using Geometric Features", Dr. Robert H. Meyer and Kevin K. Tong, S.P.I.E. Conference Paper, Nov. 3, 1988.

Primary Examiner—Leo H. Boudreau
Attorney, Agent, or Firm—William J. Streeter; Wanda K. Denson-Low

[57] ABSTRACT

An apparatus and method for processing image data to derive edges and line segments. Image intensity data is processed in one dimension along a series of scan lines to produce an intensity curve (10). Pairs of points along a scan line curve (10) representing curvature extrema (20) are checked to determine if the intensity difference between the curvature extrema (20) are characteristic of edges. Edge points are then determined between pairs of curvature extrema. Edge points found between curvature extrema (20) are then correlated with other edge points in previous scan lines to determine if they fall within a range of predicted line segments. Line segment data may then be processed at higher levels to identify objects in the data.

14 Claims, 2 Drawing Sheets

APPARATUS AND METHOD FOR EXTRACTING EDGES AND LINES

BACKGROUND OF THE INVENTION

1. Technical Field

This invention relates to image processors, and more particularly to an image processor for detecting edges and lines.

2. Discussion

The vast quantity of data available in the form of aerial, satellite and other types of imagery far exceeds the processing capacity of current computing environments. Consequently, there exists a need for systems that can rapidly and automatically detect objects given large quantities of imagery, representing unpredictable scenes and objects.

The tasks of computer vision systems fall generally into three classes: low level, middle level and high level. Low level analysis involves decomposing the raw image into easily manipulatable visual primitives such as regions and lines and their attributes such as color, texture, size, shape, orientation, length, etc. The middle level process, is concerned with analyzing the lines and regions found in the low level process and finding, for example, certain geometric shapes and patterns. High level analysis operates on the extended geometric features to arrive at a recognition and description of the objects in the scene.

The present invention is concerned primarily with improvements in low level image processing. The raw image input for low level processing typically comprises intensity changes in an image that are due in part to reflectance, depth, orientation and illumination discontinuities. The organization of significant local intensity changes (edges) into more coherent global events (lines or boundaries) is an early but important step in the transformation of the visual signal into useful intermediate constructs for middle and upper level interpretative processes. Over the past twenty years a number of methods have been developed for edge detection. These include:

1) a simple thresholded convolution (e.g. Sobel operator, Roberts cross operator) within a fixed sized two dimensional window followed by a "thinning" operation on the resulting data;
2) a Laplacian operator within a two dimensional processing window coupled with an algorithm to detect "zero-crossings";
3) the Haralick facet model algorithm; and
4) the Nevatia-Babu algorithm.

Even with these and other current methods, the generation of line segments has remained a difficult problem requiring time consuming edge chaining and line segmenting algorithms. Thus, it would be desirable to provide a technique for generating edges and line segments that is faster and more accurate than previous methods.

Besides slowness, the above techniques for edge detection have a number of other drawbacks. For example, images having a variety of resolutions and contrasts are difficult to handle due to the use of a fixed two dimensional window or patch. There are two problems resulting from the use of a fixed window: 1) when an edge is larger than the window, you get either no edge or multiple edges; and 2) if a window is too large, it blurs details by averaging data within the window. While using multiple window sizes is one approach to this problem, the complexity of sorting out the resulting data from the various window sizes has limited the usefulness of that technique. As a result, it would be desirable to provide an image processor that can handle image features of many different resolutions equally well with fewer spurious or missed edges.

A related problem caused by a fixed two dimensional window size is the resulting sensitivity to thresholds. If a window size is too small, only a part of an edge is measured. The convolution then gives a measure of only part of the intensity change, and a threshold set to detect the intensity change of an entire edge would be too high and would ignore the edge. Decreasing the threshold would result in multiple edges where only a single edge exists. Consequently, it would be desirable to provide an image processor that can properly discriminate between high and low contrast image features without being too sensitive to the threshold setting.

SUMMARY OF THE INVENTION

The present invention provides an image processor that rapidly and accurately detects edges and straight line segments from image data. The invention performs a one dimensional, rather than two dimensional, analysis of image data and it results in an effectively dynamic, rather than static, window size to ensure that the whole edge is captured. It does this by the use of a series of horizontal and/or vertical scan lines to search for one dimensional edge signatures in the scan line intensity data. Edge Curvature points in the scan line intensity data are analyzed to determine if they have certain features characteristic of edges. Once identified, pairs of these curvature points which represent edge boundaries are then used to determine single point edge locations. This may be done by finding the average intensity level between the pairs of curvature points and designating that point as the edge location. This process, in effect, sets the window size dynamically and permits edges of many different resolutions and contrasts to be analyzed.

After a point edge location is determined, point edge locations on successive scan lines may be tracked to form straight line segments. This is accomplished by setting a range for a possible line segment direction from a first point and determining if a point edge location in the next scan line is within that range. If it is, a line segment is drawn between the first and second points and the permissible range is narrowed for each edge point in succeeding scan lines until an edge point no longer fits within the permissible range. Edges falling outside a given line segment direction may then used to begin new line segments.

This entire process requires only one or two passes through the image data. Two passes could be performed simultaneously with a parallel processing architecture. The result is the extraction of edge points and line segments from digitized image data much faster than with previous comparable methods.

The invention handles image features of many different resolutions equally well. Also, edge and line segment data is extracted more "clearly" so that lines are less fragmented, with fewer spurious or missed edges. In many images the edge threshold parameter is less critical than in previous methods and properly discriminates between high and low contrast image features. The invention could also be used to detect and track other intensity features beside edges such as certain features having characteristic combinations of edges such as coastlines, roads, or vehicles. Also, the invention could be used to detect features having certain defined spectral characteristics.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENT

Figure 1:
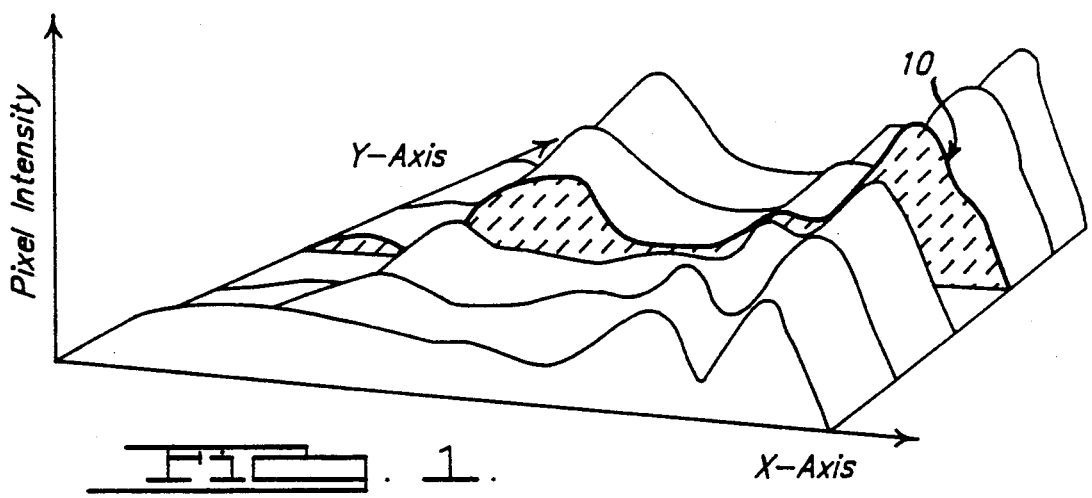
FIG. 1 is a perspective view of a series of pixel intensity curves along successive scan lines of representative image data.
Figure 2:
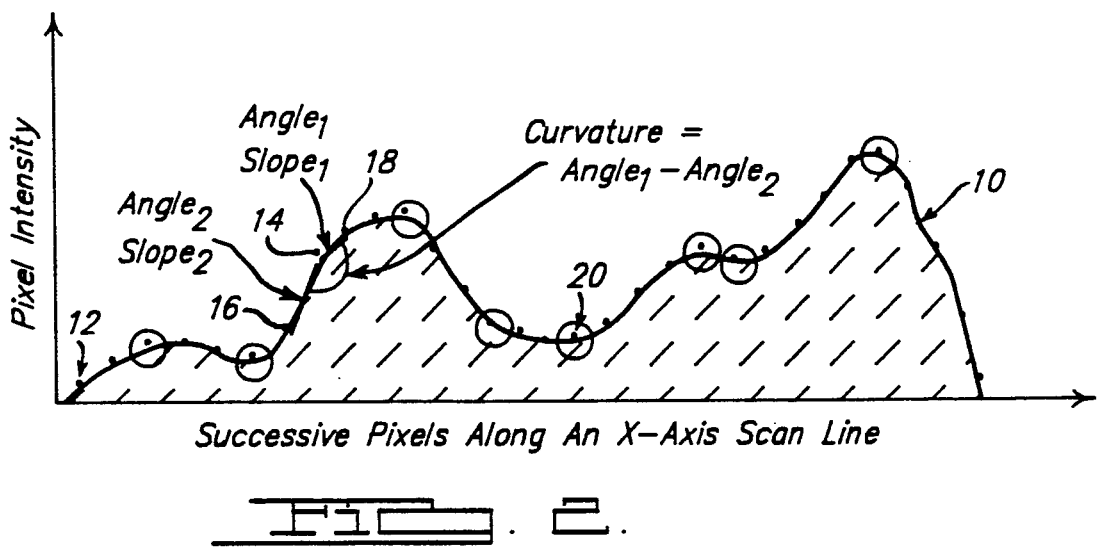
FIG. 2 is a graph of a single pixel intensity curve for successive pixels along a single scan line in accordance with the present invention.

FIG. 1 represents a two dimensional signal (i.e. an image). The x and y axes are the horizontal and vertical axes of the image while the third axis represents the intensity (brightness) of the digitized image at each point (pixel). The source of the image may be light or other regions of the electromagnetic spectrum; or it could be an acoustic image or any other desirable two dimensional signal. As a specific example, the digitized image might be obtained from a CCD sensor connected to a frame grabber that digitizes the CCD signal output and produces a 512×512 array of pixel intensity values. These values would be automatically stored in computer memory. It should be noted that, for clarity, FIG. 2 shows only 32 pixel intensity points. However, if a 512×512 element CCD sensor is used, a given scan line would actually have 512 pixel intensity points.

In accordance with the present invention, the intensity value of each pixel on the pixel intensity curve 10 is represented by an intensity points 12. It will be appreciated that the intensity data is plotted pictorially in FIGS. 1 and 2, as an illustrative aid. In practice, the methods of the present invention may be carried out by performing various calculations on the data without actually plotting the data. Likewise, the term "scan" will be used to indicate analysis of data along a particular vertical or horizontal line and does not necessarily imply any mechanical scanning motion across the image.

The present invention involves a two part procedure to arrive at line segments from image data. The first part involves the detection of edge points. The second part involves the tracking of the detected edge points to form straight lines. It will be appreciated that once the edge points have been detected, the edge points will provide information that may be used in a number of ways. However, in the preferred embodiment, it is preferred that the edge points determined by the first part of the invention then be used to arrive at line segments in accordance with the second part of the invention.

In the first part of the present invention, the detection of edge points is carried out as a one dimensional process. Initially, the intensity data such as that shown in FIG. 2 is analyzed for intensity signatures that are characteristic of edges. This may be accomplished by first processing the data with a sliding difference operator to obtain local "slopes" at each point 12 along the scan line intensity curve 10. In particular, for a given point 14 on the intensity curve 10 the slope of the line connecting that point 14 with the previous point 16 is determined. Likewise, for a succeeding point 18 the slope of a line connecting that point 18 with the previous point 14 is determined. The first derivative slopes are then converted to angles, or "angle slopes", using the function:

$$angle = tan^{-1}(c \times slope)$$

where c is a constant (less than 1) such as 0.75. The value chosen for c is not very critical. It acts as a vertical gain or amplification of the pixel intensities and is set to allow convenient integer tabular representation of the angle function.

A sliding difference of angle slopes may then be taken to obtain a slope curvature at each point along the scan line. For example, at a first point 14 the slope curvature will be equal to the angle slope at the second point 18 minus the angle slope at the first point 14.

Next, curvature extrema are located. Curvature extrema represent points on the intensity curve 10 which have maximum positive or negative local slope curvatures. In FIG. 2 curvature extrema are represented by the circled points 20. The determination of which curvatures are extrema is accomplished by comparing the magnitudes of a consecutive sequence of curvatures possessing common sign. It can be seen by inspection of FIG. 2 that curvature extrema points 20 represent points where there are relatively large changes in the slope between the curvature extrema points 20 and the preceding and succeeding points. In other words, curvature extrema are places where trends of intensity change undergo major alteration. It is this rapid alteration of intensity (or shading) trends that characterize the two sides of edge boundaries in image data. This is shown in FIG. 3.

It should be noted that in some systems noise from the sensor or other sources may introduce peaks or spikes that have nothing to do with the image being analyzed. Unfortunately, such noise spikes will possibly be interpreted as curvature extrema. In order to effectively filter out such noise all curvature extrema can be checked to see if they exceed a noise threshold. This noise threshold may be chosen to be proportional to the slopes of the scan line intensity curve at the points where the extrema are located. Curvature extrema which exceed the threshold may then be ignored since they likely represent noise. It will be appreciated that the threshold will depend on many characteristics of the system and of the image data involved and in systems that are not susceptible to unacceptable noise levels the step of comparing the curvature extrema to the noise threshold may be omitted entirely.

The next step is to confirm the existence of an edge from the curvature extrema points 20. Since the curvature extrema points 20 are determined by the data itself, the invention, in effect, sets a dynamic window size from which to find edges. From FIG. 2 it can be seen that the intensity difference between the first curvature extrema 20 at the extreme left and the second curvature extrema 20 is fairly small; while the difference in intensity between the second curvature extrema 20 and the third is much greater. One may interpret this to mean that an edge exists somewhere between the second and third curvature extrema 20, but that a surface of relatively uniform intensity (and hence no edge) exists between the first and second curvature extrema 20. Accordingly, to detect edges the intensity level at each curvature extrema 20 is compared to that at each neighboring curvature extrema 20. Where the difference exceeds a predetermined threshold an edge is confirmed.

Figure 3:
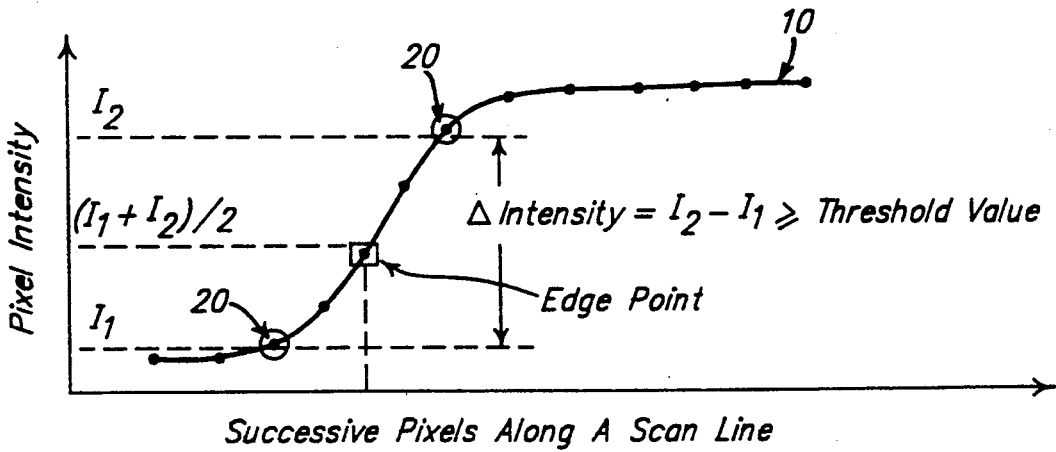
FIG. 3 is a graph of a portion of the pixel intensity curve shown in FIG. 2 showing the derivation of an edge point from two curvature extrema.

This procedure is depicted in more detail in FIG. 3. Here, a portion of the intensity curve 10 is shown having two curvature extrema 20. The intensity level at the first curvature extrema 20 is labeled $I_1$. The intensity at the second is $I_2$. An edge is confirmed if the change in intensity, $I_2 - I_1$ exceeds a predetermined threshold. In some cases it is possible for the difference between the intensity levels to exceed the threshold even where there is no edge. This may occur, for example, in the case of an extended region of gentle shading, where the total change in intensity level from one side of the region to the other is fairly large but no edge exists between the two extrema. To prevent an edge from being found in a region of gentle shading, when the intensity difference between two neighboring curvature extrema are found to exceed the predetermined threshold, the average intensity change per pixel may be checked. If the average intensity change per pixel is less than a predetermined amount, for example, one intensity unit, then it can be concluded that the region does not contain an edge but instead may be a region of gradual intensity change. In such cases no edge will be found between those curvature extrema.

Once the existence of an edge is confirmed between two curvature extrema 20, the point edge location can then be determined. This may be done by finding the average intensity level between the two curvature extrema 20. That is, the intensity level equal to $(I_1 + I_2)/2$, is found. The pixel corresponding to that average intensity level on the intensity curve 10 is then determined. The location of this pixel along the scan line is then labeled an edge point. The above procedure is repeated for each curvature extremum point 20 throughout the entire intensity curve 10 for a given scan line.

To begin forming line segments in accordance with the second part of the present invention, the entire procedure described above is repeated for a second scan line. Once edge points are found in the second scan line they can be compared to edge points in the preceding scan line to determine if a line segment can be drawn between edge points in the first and the second scan lines using the procedure described below. The line forming process is then repeated for all subsequent parallel scan lines.

In more detail, in accordance with the present invention, as each scan line is processed and rendered into a set of elected edge points, the edge points are tracked as if they were uniform velocity targets. The edge points extracted from a given scan line are associated with edge points detected in previous scan lines according to the following three rules:

1) when a detected edge point lies within "n" pixels of an edge point on the previous scan line where the point on the previous line is not already associated with a straight line segment, use the two detected edge points to initiate a straight line segment.
2) when a detected edge point does not lie within "n" pixels of an edge point on the previous scan line and it also cannot be associated with an existing straight line segment, save the location of the detected edge for the starting point of a new line segment.
3) when a detected edge point lies within "n" pixels of a predicted edge point location (where the prediction was made using knowledge of the line segments currently being tracked) attempt to add the new edge point to the appropriate line segment in the manner as described below.

The selection of "n" is not critical and it will be appreciated that the exact number can be optimized by trial and error. For example "n" in some configurations may be chosen to be 1 or 2 pixels.

Figure 4:
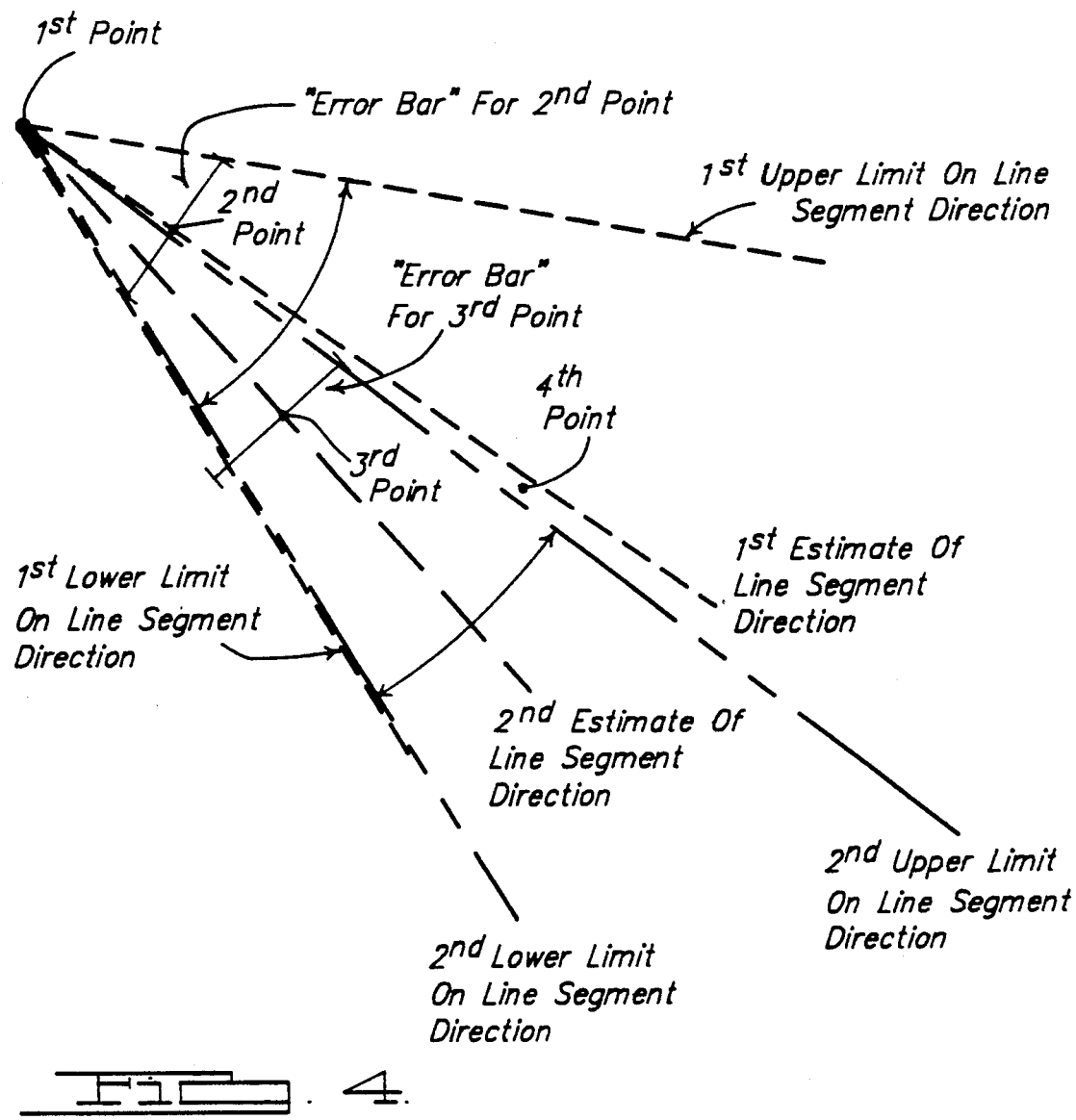
FIG. 4 is an illustration of the method of forming the line segments by tracking edge points in accordance with the present invention.

Referring now to FIG. 4, the procedure for adding to an existing line segment is illustrated. Note from Rule 1 above that the first two edge points may be used to initiate a straight line segment. From these two points an initial projected line segment direction is computed. This is labeled "first estimate of line segment direction" in FIG. 4. An "error bar" of a predetermined number of pixels (typically 1 or 2 pixels) is also assigned to the second point. This bar is used to determine the range within which the line segment direction can be adjusted as later points are added to the line segment. The idea is to permit some fluctuation of the actual position of edge points along the line segment to which they belong. On the other hand, the points must not be permitted to slowly drift off the initial line segment direction resulting in an arc instead of a straight line.

FIG. 4 also shows a third point being added to the line segment. Since the third point falls within the permissible line segment range (it is between the first upper limit and the first lower limit of line segment direction) it passes the criterion which determines that it is part of the line segment and not the start of some new line. The error bars assigned to the third point are used to establish a new and tighter range within which the line segment direction can be adjusted. This range is shown in FIG. 4 as defined by the lines labeled "second upper limit on line segment direction" and "second lower limit on line segment direction". Note that the second lower limit on line segment direction coincides with the first lower limit on line segment direction, thus effectively narrowing the new limits on line segment direction. The second estimate of line segment direction is taken to be from the first point to the third and newest point.

Finally, a fourth point is considered. As FIG. 4 illustrates, the fourth point falls outside the range of the second upper and lower limits on line segment direction. Thus, the fourth point cannot be added to the line segment. The tracking of the line segment is terminated at the third point and the location of the fourth is saved as the possible starting location of a new line segment.

It is noteworthy that both the first part of the invention (edge detection) and the second part (line segment formation) can be performed on each scan line before proceeding to subsequent scan lines. As a result, only one pass through the vertical scan lines and one pass through the horizontal scan lines is necessary. Moreover, since the vertical and horizontal scanning processes are entirely decoupled, the two passes through the data could be performed simultaneously, for example with a parallel processing architecture. In such cases the normal steps required to parallelize algorithms need not be done due to the fact that the vertical and horizontal scans are inherently separable. These features contribute to the increased speed of processing of the present invention.

There are a number of ways to separate the respective role of the vertical and horizontal scan lines to avoid redundancy and to further enhance the speed and accuracy of the invention. In this regard, it should be noted that both vertical and horizontal scans are desirable but both are not absolutely necessary. Useful line segment information can be derived from either set of scans. However, it is desirable to have both because a vertical line scan cannot process a vertical image line and a horizontal scan cannot handle a horizontal image line. Consequently, it is preferred that the roles of the vertical and horizontal scans be divided so that each has its respective "sphere of influence". For example, each set of scans may handle line segments that have a range of plus or minus 45°. Specifically, horizontal scans may handle line segments in a vertical direction and 45° on either side of vertical; vertical scans may handle line segments along a horizontal direction and also 45° on either side of horizontal. As a result, the processing will not track line segments outside the permitted range even though it would be capable of doing so.

A minor consideration is that at exactly 45° there is some ambiguity and the possibility exists that both sets of scans would ignore the 45° line segment as belonging to the other set of scan lines. Consequently, it is preferred to have the horizontal and vertical jurisdictions overlap slightly even at the risk of occasionally double counting a line.

It will be appreciated that the data produced will consist of coordinates of line segment points from vertical and horizontal scans. These may be used independently or combined. The line segment data may be plotted for visual inspection or it may be used directly in subsequent middle and higher level image analysis.

Figure 5:
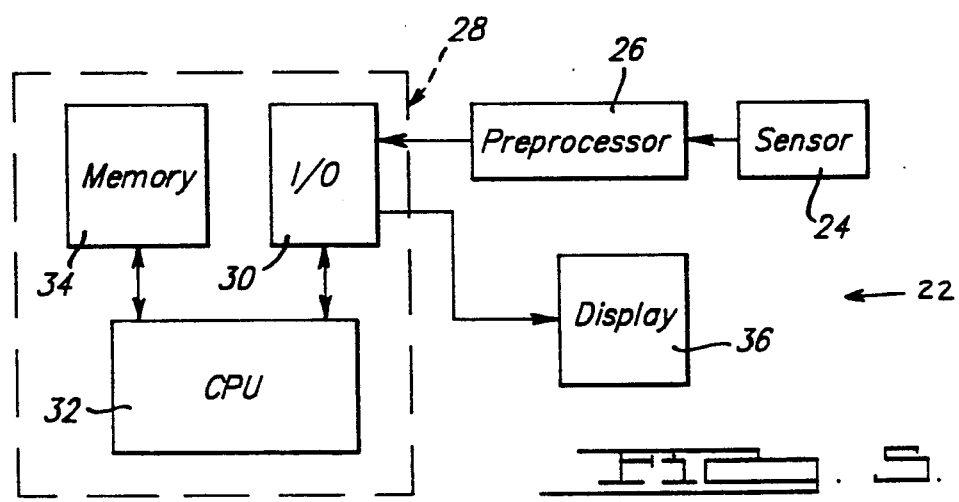
FIG. 5 is a diagram of an image processing system in accordance with the present invention.

Referring now to FIG. 5, a simplified diagram of an image processing system 22 in accordance with one embodiment of the present invention is shown. A sensor 24, which may be a CCD array, receives signals of varying intensity from an image. The sensor converts the raw signal to an electrical signal which is transmitted to a preprocessor 26. This preprocessor 26 may perform such functions as frame grabbing and digitizing for example. The digitized signal is then transmitted to a processor 28 which includes an IO unit 30, a CPU 32 and memory 34. Once the image data is received and stored in memory 34, the processor 28 may then perform the necessary calculations on the data to arrive at the edge and line locations using the techniques outlined above. Finally, the coordinate locations of the edge and line segments may be sent from the processor 28 to a display unit 36 where they may be utilized in the desired manner.

It will be appreciated that the present invention is very amenable to hardware implementations. As mentioned previously, the decoupled nature of the vertical and horizontal scans makes parallelizing the two tasks relatively simple. Also, since the processing is approached as a one dimensional signal problem it could readily be handled by a pipeline type processor with digital signal processing chips. As a result, known and readily available low cost hardware can be used to implement the present invention.

Preliminary tests have been conducted using images ranging from 512×512 pixels to 200×200 pixels square. Each pixel of the images had an intensity ranging from 0 to 255 units. The images included both visible and infrared data. Test image scenes included highly cluttered imagery with features 2 to 3 pixels apart; very low and very high contrast features with intensity variations ranging from 6 to 130 units; mixed feature resolutions with feature boundaries ranging from 4 pixels sharp to 25 pixels blurred; and small and large features ranging from under 4 pixels along the largest dimension to over 300 pixels along the largest dimension. Both timing tests and line quality tests were run on the invention which was implemented on a MicroVAX II computer. The invention took 60 seconds to extract edges from a 512×512 image of a beverage can and another 30 seconds to obtain the straight line segments. By comparison, a state-of-the-art edge extraction algorithm (the Nevatia-Babu algorithm) took 24 minutes to extract edges on the same beverage can test image. The invention was shown to handle blurred lines very well. A comparison with other state-of-the-art algorithms showed that they failed badly in their ability to handle blurred lines.

Those skilled in the art can appreciate that other advantages can be obtained from the use of this invention and that modification can be made without departing from the true spirit of the invention after studying the specification, drawings and following claims:

What is claimed is:

1. An apparatus for enhancing an image containing features, said image represented by pixel data, including feature as well as non-feature pixel data, said enhancement being produced without prior knowledge of said features, said apparatus comprising:

sensor unit for converting light energy from discrete pixels in said image into electrical signals, said pixels having defined locations in the X-Y plane;

preprocessor unit for digitizing said signals;

memory unit for storing said digitized signals;

means coupled to said memory unit for detecting and measuring the intensity of said signals at discrete pixels along a plurality of scan lines throughout said image, said intensity values creating an intensity curve along the scan lines;

means for identifying curvature extrema as those points on said intensity curves where the intensity undergoes relatively large changes with respect to previous and subsequent pixels;

means for measuring the difference in intensity between pairs of curvature extrema and identifying those pairs of curvature extrema for which said difference exceeds a predetermined threshold;

means for identifying individual edge points as a point along the scan line between said identified pairs for curvature extrema;

means for identifying first and second edge points along first and second neighboring scan lines;

means for extrapolating a line segment between said first edge point and said second edge point if the second edge point lies within n pixels of said first edge point, where n is an integer;

means for calculating upper and lower line direction limits by extrapolating a line from said first edge point to a point X pixels above said second point, where X is an integer, and by extrapolating a line from said first edge point to a point X pixels below said second point;

means for extrapolating a new line segment between said first edge point and a third edge point if that third edge point lies within aid upper and lower line direction limits; and, display unit for creating an enhanced image containing only said identified edge points and line segments, wherein said enhanced image contains predominantly edge points and lines representing said features and is relatively free of said non-feature pixels.

2. The apparatus of claim 1 wherein said scan lines are vertical as well as horizontal scan lines.

3. The apparatus of claim 1 further comprising a means for comparing said curvature extrema for each point with a second predetermined threshold that is proportional to the slope curvature for that point and means for ignoring those curvature extrema which exceed said second threshold, whereby noise in said pixel data is ignored.

4. The apparatus of claim 1 further comprising a means for comparing the average intensity change per pixel between neighboring curvature extrema and comparing this value with a third predetermined threshold wherein if said third threshold is not exceeded an edge point will not be identified between said curvature extrema.

5. A method for enhancing an image containing features, said image represented by pixel data, including feature as well as non-feature pixel data, said enhancement being produced without prior knowledge of said features, said method comprising the steps of:
converting light energy from an image into electrical signals corresponding to the intensity of said light energy in discrete pixels in said image, said pixels each having a defined location in the X-Y plane;
assigning the value of said electrical signal for each pixel to each defined location;
selecting one linear scan line of said pixels in the X-Y plane;
identifying curvature extrema in said scan line by determining those pixels for which said electrical signal values change most rapidly with respect to the values for neighboring pixels along said scan line;
measuring the difference in the magnitude of said electrical signal value between all pairs of curvature extrema along said scan line;
determining selected pairs of curvature extrema for which said difference exceeds a predetermined threshold;
identifying as an edge point a pixel along the scan line having an electrical signal value between the value for said identified pair, said pixel being located between said identified pair along said scan line; and displaying the X-Y location of said edge point;

a) identifying first and second edge points along first and second neighboring scan lines;

b) extrapolating a line segment between said first edge point and said second point if the second edge point lies within n pixels of said first edge point, where n is an interger;

c) calculating upper and lower line direction limits by extrapolating a line from said first edge point to a point X pixels above said second point, where X is an integer, and by extrapolating a line from said first edge point to a point X pixels below said second point;

d) extrapolating a new line segment between said first edge point and third edge point if that third edge point lies within said upper and lower line direction limits;

e) calculating a new upper or lower line direction limit by extrapolating a line from said first point to a point X pixels above said third edge point and extrapolating a line from said first point to a point X pixel below said third edge point, and using only those direction limits which create a narrower range of line direciton limits;

f) repeating steps b-e for a fourth and all succeeding edge points in each succeeding scan line until no edge point is found within the curren tupper and lower direction limits;

g) repeating steps a-f for edge points that fall outside upper and lower limits to create new line segments; and displaying an enhanced image containing only said identified edge points and line segments, wherein said enhanced image contains predominantly edge points and lines representing said features and is relatively free of said non-feature pixels.

6. The method of claim 5 wherein said step of converting light energy further comprises the step of providing a CCD sensor for converting said light energy.

7. The method of claim 5 further comprising the steps of digitizing said electrical signal into a digital signal for each pixel value.

8. The method of claim 7 further comprising the step of transmitting said digitized signals to a programmable processor and storing said intensity values in memory locations corresponding to pixel coordinates in said image.

9. The method of claim 5 wherein said step of identifying curvature extrema further comprises the step of determining those points where the derivative of the intensity curve exceeds a second threshold.

10. The method of claim 5 wherein said step of identifying as an edge point further comprises the step of determining the point having an intensity value equal to the average intensity of the identified pair of curvature extrema.

11. An apparatus for enhancing an image containing features, said image represented by pixel data, including feature as well as non-feature pixel data, said enhancement being produced without prior knowledge of said features, said apparatus comprising:
sensor unit for converting light energy from discrete pixels in an image into electrical signals, said pixels each having a defined location in the X-Y plane;
preprocessor means for digitizing and signal;
means for assigning the value of said electrical signal for each pixel to each defined location;
means for selecting one linear scan line of said pixels in the X-Y plane;
means for identifying curvature extrema in said scan line by determining those pixels for which said electrical signal changes most rapidly with respect to the electrical signal assigned to neighboring pixels along said scan line;
means for measuring the difference in the magnitude of said electrical signal value between all pairs of curvature extrema along said scan line;
means for determining selected pairs of curvature extrema for which said difference exceeds a predetermined threshold;
means for identifying as an edge point a pixel along the scan line having an electrical signal value between the value for said identified pair and located between said identified pair along said scan line;
means for identifying first and second edge points along first and second neighboring scan lines;
means for extrapolating a line segment between said first edge point and said second edge point if the second edge point lies within n pixels of said first edge point, where n is an integer;

means for calculating upper and lower line direction limits by extrapolating a line from said first edge point to a point X pixels above said second point, where X is an integer, and by extrapolating a line form said first edge point to a point X pixels below said second point;

means for extrapolating a new line segment between said first edge point and a third edge point if that third edge point lies within said upper and lower line direction limits; and display unit for creating an enhanced image containing only said identified edge points and line segments, wherein said enhanced image contains predominantly edge ponits and lines representing said features and is relatively free of said non-feature pixels.

12. The apparatus of claim 11 wherein said means for converting light energy is a CCD imager.

13. The apparatus of claim 11 wherein said means for digitizing is a frame grabber preprocessor.

14. The apparatus of claim 11 further comprising means for comparing said curvature extrema for each point with a second predetermined threshold that is proportional to the slope curvature for that point and means for ignoring those curvature extrema which exceed said second threshold, whereby noise in said image data is ignored.

* * * * *